J. Matthews, Jr.,

Soda Apparatus.

No. 98,178. Patented Dec. 21, 1869.

Witnesses:
Fred Haynes
D. W. Coombs

Inventor.
John Matthews Jr.

United States Patent Office.

JOHN MATTHEWS, JR., OF NEW YORK, N. Y.

Letters Patent No. 98,178, dated December 21, 1869.

---

IMPROVEMENT IN SIRUP-RESERVOIRS FOR SODA-FOUNTAINS.

---

The Schedule referred to in these Letters Patent and making part of the same

---

To all whom it may concern:

Be it known that I, JOHN MATTHEWS, Jr., of the city, county, and State of New York, have invented a new and useful Improvement in Apparatus for Dispensing Sirup and other liquids, of which the following is a full, clear, and exact description, reference being had to the accompanying drawing, forming part of this specification, and in which—

Figure 1:
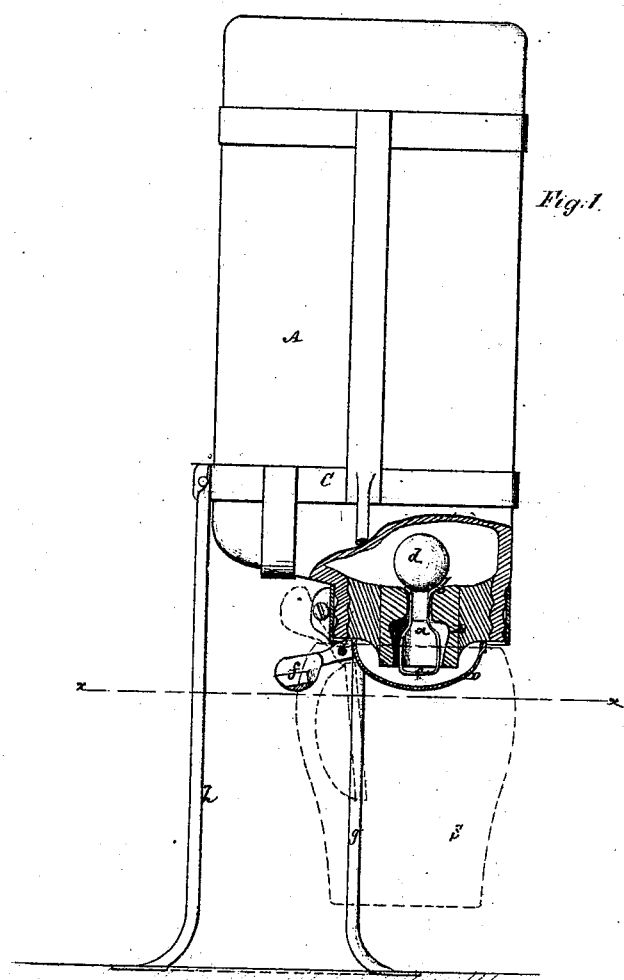
Figure 2:
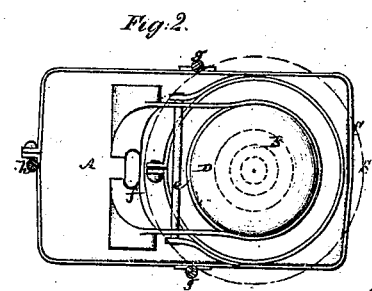

Figure 1 represents a partly sectional side elevation of an apparatus, constructed in accordance with my improvement, and Figure 2, an inverted plan or horizontal section, taken as denoted by the line $x\ x$ in fig. 1.

Similar letters of reference indicate corresponding parts.

The apparatus which is the subject of the present specification, is mainly designed for the dispensing of sirups to soda-water, and other like beverages, but is also applicable to dispensing other liquids. It will be described here, however, as restricted to the dispensing of sirups.

The novel features of the invention are shown in connection with a sirup-vessel or reservoir, closed at its top, but having a discharging-nozzle at its bottom, under seal by a trap, that serves to support the column in the reservoir above the level of the trap, which, as draught is established, admits air, to maintain the equilibrium that is produced in part by the weight of the column, and in part by the partial vacuum above it, within the vessel, as against the pressure of the outside atmosphere.

My invention consists in a combination, with such a vessel, of a movable trap to the discharging-mouth or nozzle, in the bottom of the vessel, the same, when closed, operating to seal the discharging-nozzle, and to prevent ingress of air to the vessel, but, when opened, allowing of air to enter, and of a limited discharge of the contents of the vessel, as contained within the vessel, or between the inner end of the orifice and trap, which may also be constructed to operate in part as a measure.

Furthermore, the invention consists in such a construction of said trap, or combined trap and measure, as that it is pivoted to swing up and down in opening and closing, and is provided with a weighted lever or extension, so arranged as that the trap is not only made self-closing, but facility is afforded, by merely raising a tumbler up against such lever or extension, for opening the trap, to discharge its contents into said tumbler or receiver.

Likewise, the invention includes a combination, with said trap and measure, of guide-rods, so arranged as to adjust the tumbler to its proper position under the trap, and to direct the same, when being elevated, to open the latter.

Also, the invention comprises, in combination with a movable trap and vessel or reservoir, constructed to operate as described, a partially-closing valvular device or constrictor, for reducing the area of discharge from the vessel or reservoir, when in working position, but allowing of a large or freely-open mouth, for filling or replenishing the vessel, when the latter is inverted for the purpose.

Referring to the accompanying drawing—

A represents a sirup-can or vessel, closed at its top, but provided at its bottom with a nozzle, B, which may be of any suitable shape, but is here shown as of more contracted area at its inner than at its outer end, and more or less swelled out in between said ends, to form a measuring-chamber, $a$. The relative areas, however, of the discharging-end of the nozzle and orifice in the bottom of the vessel may be varied, but it is desirable that the mouth or opening thus established should be sufficiently large to admit of easy filling, when the vessel A is inverted for the purpose. Such sized opening, however, would be too large for the apparatus, fitted with a trap, to operate as hereinbefore referred to; accordingly, I partially plug or close such outlet or opening, in such manner as that it reduces the area of discharge from the vessel, when the latter stands in working position, but allows of said passage or opening being fully or freely opened, when the vessel A is inverted, for the purpose of pouring sirup into it.

This adjustment of or alteration in area of the discharge-passage, I effect by employing what may be termed a constrictor, which may be variously constructed, but which I prefer to make automatic in its action, so that when the vessel A stands in working position, it reduces the area of discharge, as required, but when said vessel is inverted, fully opens such passage. Thus loosely inserted within the nozzle, and extending up through the discharge-orifice $b$, of or to the vessel A, and lapping over the edges of the same, is a wire frame or stirrup, $c$, on which is allowed to rest a loose ball-valve, $d$, that, thus supported, constricts the area of the orifice $b$, but when the vessel A is inverted for filling, moves out of the way, and establishes a full or free opening through the nozzle and orifice $b$, returning again to its original position on the stirrup, and the latter dropping to its place when the vessel is restored to its working position.

Said vessel A may be supported or carried by slipping it down into a suitable receiving-frame, C, and be withdrawn therefrom, when required to invert it for filling.

The trap D, which serves to seal or close the nozzle B, may be either of disk or cup-shape, and when made of the latter form, operates in part as a measure, but the chamber $a$ in the nozzle is designed to constitute n approximate measure of each discharge, and may be spread out or enlarged to be of any required capacity.

This trap D is pivoted or hinged, as at $e$, and provided, in rear of such fulcrum, with a weighted lever, $f$, of such shape as that on moving up a tumbler, S, under the nozzle B, it strikes the lever $f$, and opens the trap, to secure a discharge of sirup, as represented by dotted lines in fig. 1, said trap, by means of its weighted lever $f$, adjusting itself to a closed position again, when the tumbler is moved away.

To adjust the tumbler in an automatic manner to its proper position under the nozzle of the vessel, and to direct it when being elevated to secure its proper action on the weighted lever $f$, I provide, and suitably arrange for the purpose, side guide-rods $g\ g$, up against which the tumbler is slid and elevated. These rods, together with an additional rod, $h$, may form the legs or supports to the frame C, by which the latter, though, if desired, a suitable base-plate, may be secured to the stand or counter.

What is here claimed, and desired to be secured by Letters Patent, is—

1. The combination, with the dispensing-vessel or reservoir, provided with a measuring-nozzle, for action, as described, of a movable or adjustable trap, operating, when closed, to seal said nozzle, and serving, when open, to effect discharge of liquid lying between the trap and orifice in the bottom of the vessel, and to admit air to the latter, substantially as specified.

2. The trap D, hinged or pivoted, as described, and provided with a weighted extension or lever, $f$, in rear of its fulcrum, in combination with the vessel A and nozzle B thereto, essentially as and for the purposes herein set forth.

3. The combination, with the dispensing-vessel or reservoir, and its measuring-nozzle, and trap thereto, of a device operating to constrict the area of the discharging-orifice in the vessel, when the latter stands in working position, but allowing of said orifice being fully or freely opened, when the vessel is inverted for filling, substantially as specified.

4. The combination of the tumbler guide-rods $g\ g$, with the trap D, constructed to operate essentially as herein set forth.

JOHN MATTHEWS, Jr.

Witnesses:
FRED. HAYNES,
M. J. SHANLYS.